United States Patent [19]

Okamura et al.

[11] 4,142,020
[45] Feb. 27, 1979

[54] HETERO-MACROCYCLIC COMPOUND COATED ON THE SURFACE OF SOLID

[75] Inventors: Hiromichi Okamura; Iwao Kato, both of Ichihara; Michio Hiraoka, Tokyo; Kinuko Torium, Ichihara, all of Japan

[73] Assignee: Nippon Soda Company, Ltd., Tokyo, Japan

[21] Appl. No.: 812,446

[22] Filed: Jul. 5, 1977

[30] Foreign Application Priority Data

Jul. 8, 1976 [JP] Japan .................................. 51-80332

[51] Int. Cl.$^2$ ............................................ B32B 33/00
[52] U.S. Cl. ..................................... 428/403; 428/406; 428/407; 428/408; 428/411; 428/412; 428/417; 428/418; 428/441; 428/451; 428/461; 428/474; 428/454; 428/483; 428/507; 428/516; 428/520; 210/38; 210/39; 210/500 M

[58] Field of Search ............... 428/403, 411, 406, 412, 428/407, 417, 418, 408, 441, 451, 461, 474, 483, 454, 507, 516, 520

[56] References Cited

U.S. PATENT DOCUMENTS

| 3,817,386 | 6/1974 | Frost et al. ................. 210/500 M X |
| 3,993,707 | 11/1976 | Cummings ........................ 428/417 X |
| 3,994,866 | 11/1976 | Lund et al. ................. 210/500 M X |
| 4,009,224 | 2/1977 | Warnken ........................... 428/418X |

*Primary Examiner*—P. C. Ives
*Attorney, Agent, or Firm*—George B. Oujevolk

[57] ABSTRACT

Hetero-macrocyclic compound coated on the surface of a solid comprising a reaction mixture of (a) hetero-macrocylic compound having at least one amino group in the molecule and (b) a compound selected from the group consisting of an epoxy compound and a isocyanate compound.

2 Claims, No Drawings

HETERO-MACROCYCLIC COMPOUND COATED ON THE SURFACE OF SOLID

DETAILED DESCRIPTION OF THE INVENTION

It has heretofore been known that a hetero-macrocyclic compound has various specific properties such as selective capture of cation, solubilization of inorganic salts or alkali metals in an organic solvent and catalysis for various organic reactions owing its complexation ability by holding a cation into a cavity of hetero-macrocyclic molecule.

In view of the above, many researches have been developing for various application fields such as organic synthesis, polymer synthesis, resolutions of optical isomers, capture and separation of metal ions, analysis, ion-selective electrodes, agricultural chemicals and medicines, etc.

However, for practical use there are some difficulties, for example, when a hetero-macrocyclic compound is employed as a catalyst for an organic synthesis, it is difficult to recover it completely from reaction system. Further, when a hetero-macrocyclic compound is employed as an adsorbent for metal ions, it is difficult to recover the hetero-macrocyclic compounds completely because of its solubility for various solvents.

To overcome the aforementioned disadvantages, polymerization of the monomer containing hetero-macrocyclic compound has been tried. Feigenbaum et al prepared a polyamide film formed from the polycondensation product of diamino-dibenzo-18-crown-6 and isophthaloyl chloride. They measured the adsorption ability of the polyamide film for alkali metal and alkali earth cations. (J. Polymer Science Vol. 9, P.817, 1971)

Furthermore, L. W. Frost described a polymeric membrane formed from the reaction product of diaminodiaryl-macrocyclic polyether and dianhydride compound. (U.S. Pat. No. 3,956,136)

However, we found that the best means to unsolublize a hetero-macrocyclic compound as well as to heighten the capacity of adsorption is to use a solid (carrier) which holds the resin in a state covering the surface of the solid (carrier) or in an impregnated state.

It is an object of the invention to insolublize the hetero-macrocyclic compound.

It is another object of the invention to heighten the capacity of adsorption of hetero-macrocyclic compound.

It is another object of the invention to provide an economical method for the selective separation of cations such as those of elements belonged in I, II, Lanthanides, and Actinides group of the periodic table, and $Pb^{++}$ and $RN^+H_3$, $NH_4^+$.

In the invention, heteromacrocyclic compound coated on the surface of solid (carrier) is obtained by reaction between (a) hetero-macrocyclic compound having at least one amino group and (b) a compound selected from the group of an epoxy compound and isocyanate compound on the surface of the solid (carrier).

Hetero-macrocyclic compound having at least one amino group has the following structure:

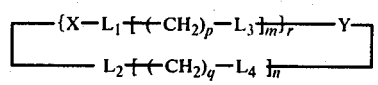

wherein X is an amino- or alkylamino-substituted divalent aromatic or alicyclic hydrocarbon, or hetero-cyclic radical such as

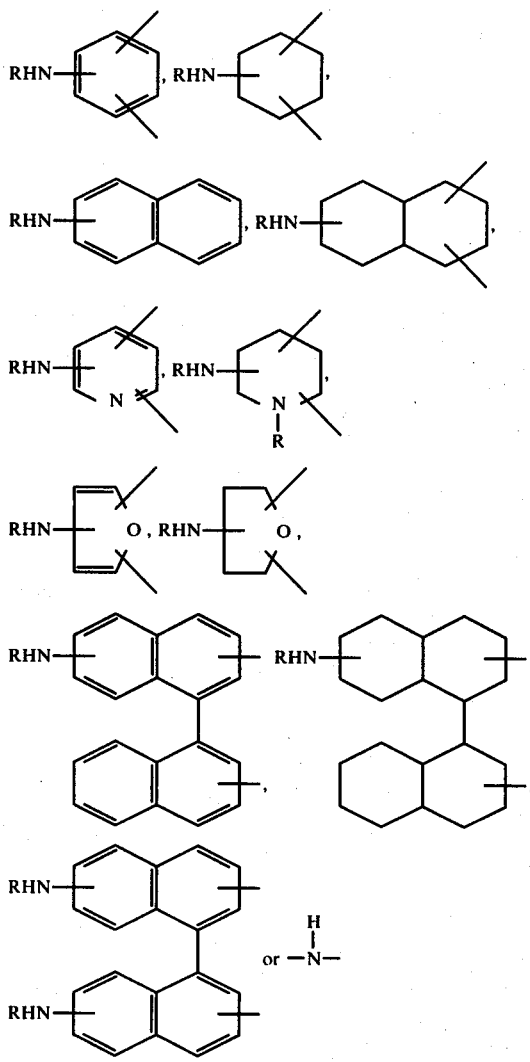

(wherein R is H or a hydrocarbon radical having 1 to 10 carbon atoms); Y is an amino- or alkylamino-substituted aromatic or alicyclic hydrocarbon or heterocyclic radical, $-CH_2-CH_2-$,

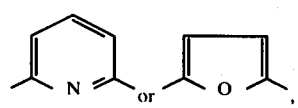

$L_1$, $L_2$, $L_3$ and $L_4$ are independently $-O-$, $-S-$, or

(R is a hydrocarbon radical having 1 to 10 carbon atoms); p and q are independently 2 or 3; r is 1, 2 or 3; and m and n are independently from 1 to 7.

The followings are typical examples of hetero-macrocyclic compound having at least one amino- or alkyl-amino group:

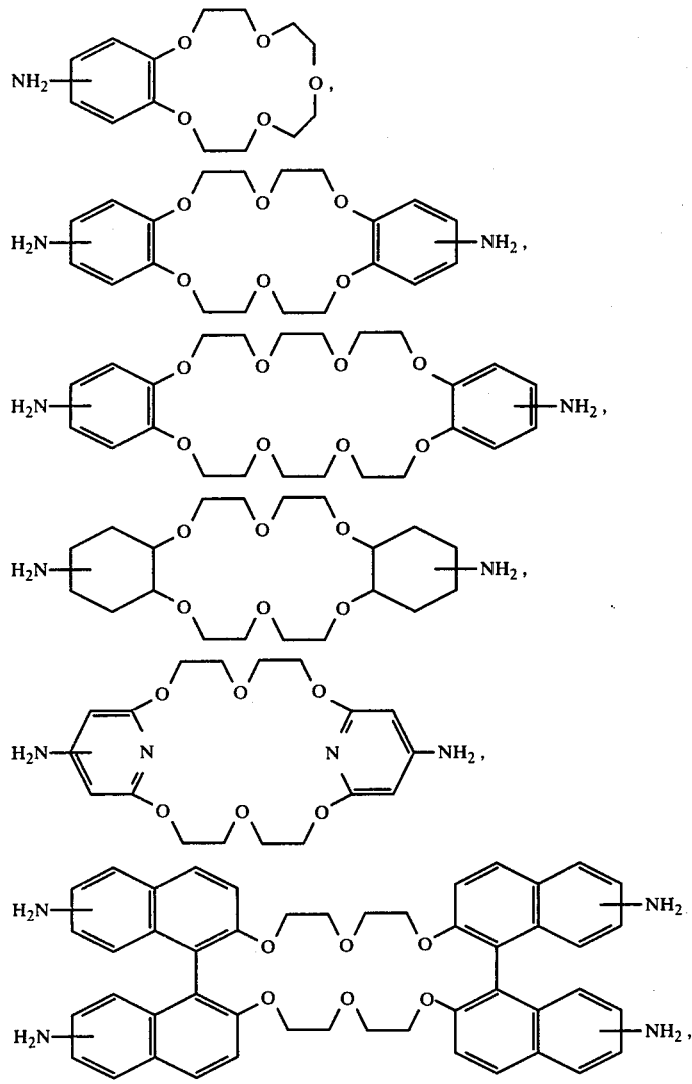

In the invention epoxy compound or isocyanate compound is employed as a reactive matrix, because they have a superior adhesive property to the surface of the various solid (carrier), as well as a superior chemical resistant and water resisting property to the others.

In the invention, epoxy compound is defined to a compound which have at least one epoxy group

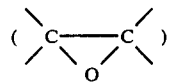

in the molecule. The followings are typical examples of the epoxy compound:

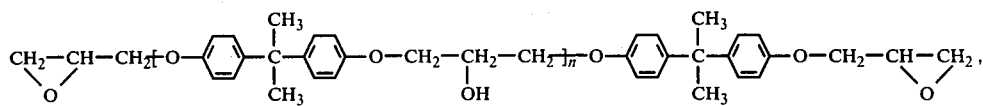

(wherein n = 0 to 12)

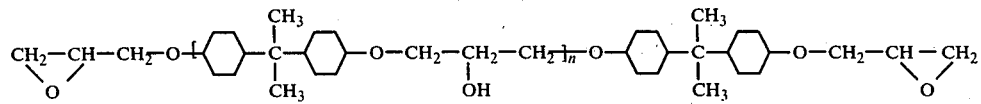

(wherein n = 0 to 12)

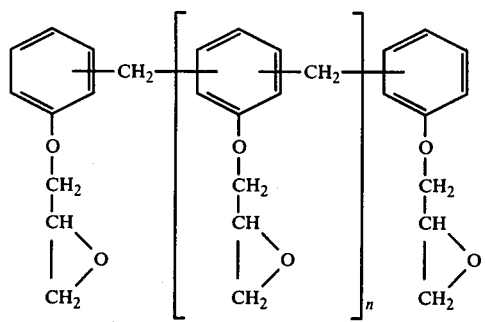

(wherein n = 0 to 12)

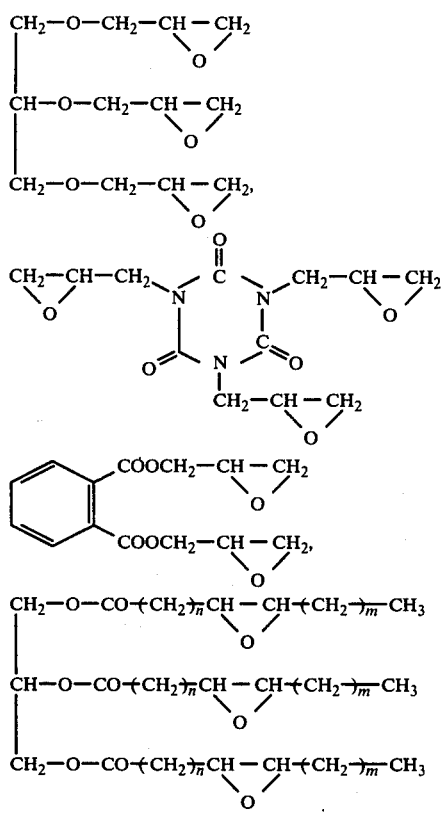

wherein n = 1 to 10, and m = 1 to 10,

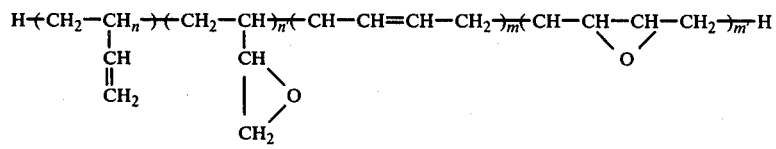

wherein n = 1 to 100, n' = 1 to 20, m = 1 to 100, and m' = 1 to 20,

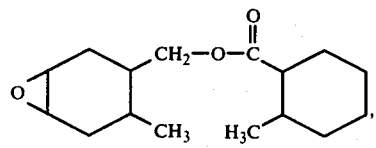

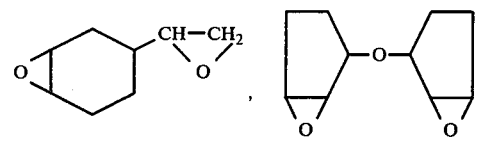

In the invention, isocyanate compound is defined to a compound having at least one isocyanate group. The followings are typical examples of the isocyanate compound: phenyl diisocyanate, toluylene diisocyanate (TDI), TDI-dimer, TDI-trimer, diphenylmethanediisocyanate (MDI), O-tolydinediisocyanate, xylenediisocyanate, hexamethylenediisocyanate (HDI), HDI-dimer, HDI-trimer, and isocyanate terminated polyalcohol, polyester, polyether, or polybutadieneglycol.

In the invention, solid (carrier) is selected from the group consisting of metal, glass, ceramic, alumina, silica, diatomaceous earth, carbon, sand, clay, and natural and synthetic polymer such as cellulose, agalose, polyaminoacid, polystyrene, polyamide, polyester, polyacrylonitrile being various in form such as powder, granule, fiber, cloth, net, film (membrane), boad, lump, et al. The form or shape of the solid (carrier) is selected to meet a use.

In the invention, the method to coat the surface of the solid (carrier) with the reaction mixture of (a) heteromacrocyclic compound having at least one amino group and (b) epoxy compound or isocyanate compound is shown as follows:

The solid is dipped in the solution of (a) and dried. Secondarily, the solid is dipped in the solution of (b) and dried. Then, the solid is cured at 10 to 200° C. for 30 min. to 3 hours. In the above method, the order of (a) and (b) can be reversed, and dipping is substituted for spraying or painting by paint-brush, etc. Further, the solid can be dipped in the solution of both (a) and (b). However, in this case the gelation of the solution must be taken care of.

In the invention, it is preferable to use a solvent in order to disperse a hetero-macrocyclic compound on the surface of the solid and to make a thin layer of reaction mixture between (a) and (b). For example, N,N-dimethylformamide, dimethylsulfoxide or acetonitrile is employed as a solvent for (a), and benzene, toluene, chloroform, methanol, carbontetrachloride or 1,2-dichloroethane is employed as a solvent for (b).

The concentration of (a) in the solvent is selected in the range of 0.1 to 50 weight %, preferably 0.5 to 10 weight %. And the concentration of (b) in the solvent is selected in the range of 0.1 to 80 weight %, preferably 1.0 to 30 weight %. It is preferable to remove the solvent in the thin layer as much as possible before curing.

The thin layer consisting of reaction mixture of (a) and (b) on the surface of the solid (carrier) should be produced in order to contain (a) at a desired amount of 0.001 to 30 weight %, preferably 0.01 to 10 weight % to the solid (carrier), and to have a thickness of layer in the range of 1 to 30μ, preferably 5 to 20μ. And for these purpose, the solutions of (a) or/and (b) is preferably prepared in concentration as above mentioned.

Hetero-macrocyclic compound thin coated on the surface of the solid is insoluble and has an increased capacity of adsorption and can selectively adsorb the various cations such as the elements which belong in the I, II, Lanthanides or Actinides of the periodic table, lead and $RN^+H_3$, wherein R represents hydrogen or a hydrocarbon group having 1 to 10 carbon atoms, in accordance with the cavity size of hetero-macrocyclic molecule. For example, the separation of potassium ions from a solution containing potassium ions and sodium ions is carried out by the simple operation such as column adsorption. The separation of strontium ions from calcium ions is also carried out by simple operation. Further, selective adsorption of uranyl ion and uranus ion from the other elements is economically carried out.

And, when hetero-macrocyclic compound coated on the surface of the solid is employed as a catalyst of an organic reaction, separation of the catalyst from the reaction mixture can be carried out easily by means of filtration without loss of the catalyst, further, thus the recovered catalyst can be employed repeatedly without any treatment such as reactivation.

The effects of the present invention will be shown in the following Examples and Tests. All quantities described in this specification and the appended claims as "%" or "parts" refer to "% by weight" or "parts by weight" unless expressly stated otherwise.

EXAMPLE 1

Preparation of a hetero-macrocyclic compound coated on the surface of alumina particle with a epoxy resin;

In a 200 ml egg-plant type flask was placed 21.4 g of powdered alumina (200–300 mesh) and a solution of 1.1 g (3.1 m mole) of epoxy compounds (bisphenol type, M.W.≃355, epoxide value: 182 to 194, liquid at R.T.) in 40 ml of chloroform. The flask was attached to a rotary evaporator and the solvent was evaporated. Then a solution of 500 mg (1.3 m mole) of diaminodibenzo-18-crown-6 in 20 ml of dimethylformamide (DMF) was added and the solvent was removed in vacuo. After the solvent was removed, the alumina powder was stirred at 150° C. for 3 hours to harden the epoxy resin on the surface. The powder was washed with chloroform and dried in vacuo at 80° C. for 3 hours. 22.9 g of light yellow powder of almina was obtained.

Specific gravity: 0.66
(wt% of hetero-macrocyclic compound: 2.2%)

EXAMPLE 2

In a 200 ml egg-plant type flask was placed 36.0 g of powdered silicagel (100–200 mesh) and a solution of 2.0 g (4.6 m mole) of epoxy compound (polyphenol type M.W.≃432, epoxide value: 180–190, liquid at R.T.) in 50 ml of benzene. The flask was placed at a rotary evaporator and benzene was evaporated. A solution of 1.0 g (2.1 m mole) of diaminodibenzo-24-crown-8-polyether in 30 ml of acetonitrile was added and the solvent was removed similarly. Then the powdered silicagel was stirred at 160° C. for 3 hours to harden the epoxy resin on the surface of silicagel. The powdered silicagel was washed with benzene and dried in vacuo at 80° C. for 3 hours. 38.8 of light yellow powder of silicagel was obtained.

Specific gravity: 0.52
(wt% of hetero-macrocyclic compound: 2.6%)

EXAMPLE 3

In a 500 ml egg-plant type flask was placed 25.0 g of diatomaceous earth (200–300 mesh) and a solution of 1.3 g (2.5 m mole) of epoxy compound (polybutadiene type, M.W.≃530, epoxide value: about 150, liquid at R.T.) in 40 ml of ethylenedichloride. The flask was attached to a rotary evaporator and the solvent was evaporated. A solution of 400 mg (1.2 m mole) of diaminodibenzo-14-crown-4- polyether in 20 ml of chloroform was added and the solvent was removed similarly. Then the powder was stirred at 120° C. for 3 hours to harden the epoxy resin on the surface of diatomaceous earth. The powder was washed with ethylenedichloride and dried in vacuo at 80° C. for 3 hours. 26.2 g of diatomaceous earth coated with epoxy resin containing 1.5 wt% of hetero-macrocyclic compound was obtained.

Specific gravity: 0.20

EXAMPLE 4

In a 300 ml egg-plant type flask was placed 50.0 g of polystyrene beads (1% DVB-bridged, 200 to 300 mesh) and a solution of 2.2 g of epoxy compound (the same as Example 1) in 80 ml of methanol. The flask was attached to a rotary evaporator and the solvent was evaporated. A solution of 1.1 g (2.8 m mole) of 4,4'-diaminodipyridino-20-crown-6-polyether in 40 ml of DMF was added and the solvent was removed in vacuo. Then the polystyrene beads was stirred at 80° C. for 4 hours to harden to epoxy resin on the surface of beads. The beads was washed with methanol and dried in vacuo at 60° C. for 3 hours. 53.0 g of polystyrene beads coated epoxy resin containing 2.1 wt% of hetero-macrocyclic compound was obtained.

Specific gravity: 0.82

EXAMPLE 5

In a 3 l round-bottomed flask was placed 100 g of glass wool and a solution of 20 g (60 m mole) of epoxy compound (the same as Example 1) in 400 ml of benzene. After the solvent was removed by evaporation, a solution of 10.0 g (26 m mole) of diaminodibenzo-18-crown-6-polyether in 400 ml of DMF was added and the solvent was evaporated in vacuo.

After the glass wool was heated at 150° C. for 3 hours in air bath, washed with methanol and dried at 80° C. in vacuo.

130 g of glass wool coated with epoxy resin containing 7.7 wt% of heteromacrocyclic compound was obtained.

EXAMPLE 6

In a 1 liter round-bottomed flask was placed 300 g (845 m mole) of epoxy compound (the same as Example 1) and 150 g (384 m mole) of diaminodibenzo-18-crown-6-polyether and stirred at 130°–140° C. When the viscosity of the mixture increased, some portion of viscous liquid was put on the (a) stainless steel net (300 mesh, 30 × 100 cm), (b) porous plate of vinyl chloride (diameter of porosity: 0.5 mm, 1 mm × 30 cm × 30 cm) and was coated with doctor blade.

The stainless net (a) was dried at 150° C. for 3 hours and porous plate (b) was dried at 80° C. for 5 hours to harden the epoxy resin layer.

TEST 1

Metal ion trapping ability of powdered solid of Example 1 to 3 by the following method: 1.0 g of powdered solid of Example 1 to 3 was added to 50 ml of an aqueous solution of a metal salt (metal ion concentration: 0.01 M/l) and stirred at 25° C. for 4 hours, and then filtered. Metal ion concentration of the filtrate was measured by the use of uni-valent or di-valent ion selective electrode. Similarly, the value of the case of addition of hetero-macrocyclic compound only was measured for comparison. The results are shown in Table 1.

The results (Table 1) indicated that metal ion trapping ability of the hetero-macrocyclic compound coated on the surface of powdered solid with epoxy resin was superior to that of non-coated hetero-macrocyclic compound.

TEST 2

Separation of potassium ion from an aqueous solution of potassium ion and sodium ion 1.0 g (2.7 m mole) of diaminodibenzo-18-crown-6-polyether was coated on the surface of 20.0 g of powdered silicagel (200 to 300 mesh) with 2.0 g of epoxy compound (the same as Example 1) according to the method of Example 1.

16.0 g of this powdered silicagel was packed with distilled water in a glass column (diameter 2.0 cm, 13.5 cm long) and 50 ml of an aqueous solution mixture of sodium chloride and potassium chloride ($5.0 \times 10^{-3}$ M/l of each ion concentration) was passed through at the rate of 8.5 ml/hr (SV=0.2), and then 150 ml of distilled water was passed through at the same rate.

The concentration of sodium ion and potassium ion in each 10 ml fraction of effluent were measured by ion selective electrode.

The results are shown in Table 2.

As 99.6% of the initial charged amount of potassium ion was trapped, the effluent solution was almost an sodium chloride solution.

TEST 3

Separation of strontium ion from an aqueous solution of strontium ion and calcium ion 10 ml of an aqueous solution mixture of strontium chloride and calcium chloride ($Ca^{2+}$: $1.03 \times 10^{-2}$M/l, $Sr^{2+}$: $1.61 \times 10^{-2}$M/l) was passed through a glass column ($\phi = 1.2 \times 27.3$ cm) packed with 21.0 g of powdered silicagel of Test-2 and distilled water at the rate of 9.3 ml/hr (SV = 0.3). Then 100 ml of distilled water was passed through at the same rate. The concentration of strontium ion and calcium ion in each 10 ml fraction of effluent solution was measured by the use of atomic absorption spectroscopy. The results are shown in Table 3.

For strontium ion 99.7% of the initial charged amount was trapped and for calcium ion 21.1% was trapped.

The effluent solution was almost calcium solution and strontium was hardly detected.

TEST 4

Separation of uranium from an aqueous solution of uranium and iron 2.5 g (6.5 m mole) of diaminodibenzo-18-crown-6-polyether was coated on the surface of 107.0 g of diatomaceous earth (100 to 200 mesh) with 5.5 g of the epoxy compound (the same as Example 1) according to the method of Example 1.

26.0 g of this diatomaceous earth was added to 100 ml of an aqueous solution containing 0.1 g/l of uranium, and stirred by a magnetic stirrer for 3 hours at room temperature. After filtration, the concentration of uranium and iron in the filtrate was measured by the fluorescence X-ray analysis. For uranium 75 weight % of the initial charge was trapped. But, for iron only 0.5 weight % of the initial charge was trapped.

TEST 5

Separation of lead iron from an aqueous solution of lead ion and tinous ion 10 ml of an aqueous solution mixture of lead chloride and tinous chloride ($Pb^{2+}$: $1.05 \times 10^{-3}$M/l, $Sn^{2+}$: $2.36 \times 10^{-3}$M/l) was passed through a glass column ($\phi = 1.2 \times 27.3$ cm) packed with 25.0 g of powdered silicagel of Test-2 and distilled water at the rate of 15.5 ml/hr (SV≃0.5). Then 100 ml of distilled water was passed through at the same rate. The concentration of lead ion and tinous ion in each 10 ml of effluent fraction was measured by the use of atomic absorption spectroscopy.

The results are shown in Table 4.

For lead ion 99.9% of the initial charged amount was trapped and for tinous ion 1.3% was trapped. The effluent solution was almost tin solution.

TEST 6

Separation of mercuric ion from an aqueous solution of mercuric ion and zinc ion 10 ml of an aqueous solution mixture of mercuric chloride and zinc chloride ($Hg^{2+}$: $1.54 \times 10^{-3}$M/l, $Zn^{2+}$: $2.36 \times 10^{-3}$M/l) was passed through a glass column ($\phi = 1.2 \times 27.3$ cm) packed with 21.0 g of diatomaceous earth of Test 2 and distilled water at the rate of 14.3 ml/hr (SV≃0.46). Then 100 ml of distilled water was passed through at the same rate. The concentration of mercuric ion and zinc ion in each 10 ml of effluent fraction was determined by the use of atomic absorption spectroscopy.

The results are shown in Table 5.

For mercuric ion 98.7% of the initial charged amount was trapped and for zinc ion 1.8% was trapped.

The effluent solution was almost zinc solution.

Table 1

| No. | Sample | Selectivity of trapped ion | maximum amount of trapped metal |
|---|---|---|---|
| 1 | Powdered solid of example 1 | $K^+ > Na^+ > Ca^{2+} > Mg^{2+} > Ba^{2+} > Li^+$ | $K^{30}$: 0.34 m mole/g solid |
| Ref. 1 | non-coated diaminodibenzo-18-crown-6-polyether | clear trapping ability was not detected. | $K^+$: less than 0.001 m mole/g.solid |
| 2 | Powdered solid of example 2 | $Ba^{2+} > Ca^{2+} > K^+ > Mg^{2+}$ | $Ba^{2+}$: 0.28 m mole/g.solid |
| Ref. 2 | non-coated diaminodibenzo-24-crown-8-polyether | $Ba^{2+} > Ca^{2+}$ | $Ba^{2+}$: 0.01 m mole/g solid |
| 3 | Powdered solid of example 3 | $Na^+ > Li^+ >> K^+$ | $Na^+$: 0.30 m mole/g.solid |
| Ref. 3 | non-coated diaminodibenzo-14-crown-4- | clear trapping ability was not detected because of | |

Table 1-continued

| No. | Sample | Selectivity of trapped ion | maximum amount of trapped metal |
|---|---|---|---|
| | polyether | dissolution | |

Table 2

The amount of sodium and potassium ion in effluent solution
(The ratio of effluent amount for the initial charged amount)

| No. | fraction (ml) | Na$^+$ (%) | K$^+$ (%) |
|---|---|---|---|
| 1 | 0 – 10 | 0 | 0 |
| 2 | 10 – 20 | 0 | 0 |
| 3 | 20 – 30 | 1.6 | 0 |
| 4 | +– 40 | 3.8 | 0 |
| 5 | 40 – 50 | 4.7 | 0.1 |
| 6 | 50 – 60 | 7.3 | 0.2 |
| 7 | 60 – 70 | 11.3 | 0.1 |
| 8 | 70 – 80 | 13.5 | 0 |
| 9 | 80 – 90 | 3.3 | 0 |
| 10 | 90 – 100 | 0 | 0 |
| 11 | 100 – 110 | 0 | 0 |
| | Total amount | 45.5 | 0.4 |

Table 3

| | ion concentration of each fraction | |
|---|---|---|
| | Ca$^{2+}$ (ppm) | Sr$^{2+}$ (ppm) |
| Initial sol'n | 350 | 136 |
| 1 | 1.2 | 0.0 |
| 2 | 1.5 | 0.0 |
| 3 | 34.0 | 0.0 |
| 4 | 220.3 | 0.3 |
| 5 | 4.9 | 0.1 |
| 6 | 2.7 | 0.0 |
| 7 | 1.7 | 0.0 |
| 8 | 2.4 | 0.0 |
| 9 | 2.5 | 0.0 |
| 10 | 2.5 | 0.0 |
| 11 | 2.4 | 0.0 |
| Total | 276.1 (78.9%) | 0.4 (0.3%) |

Table 4

| No. | Fraction (ml) | Sn$^{2+}$ (%) | Pb$^{2+}$ (%) |
|---|---|---|---|
| 1 | 0 – 10 | 0 | 0 |
| 2 | 10 – 20 | 0 | 0 |
| 3 | 20 – 30 | 1.3 | 0 |
| 4 | 30 – 40 | 5.5 | 0 |
| 5 | 40 – 50 | 80.3 | 0.1 |
| 6 | 50 – 60 | 6.6 | 0 |
| 7 | 60 – 70 | 3.1 | 0 |
| 8 | 70 – 80 | 1.9 | 0 |
| 9 | 80 – 90 | 0 | 0 |
| 10 | 90 – 100 | 0 | 0 |
| | Total | 98.7 | 0.1 |

Table 5

| No. | fraction (ml) | Zn$^{2+}$ (%) | Hg$^{2+}$ (%) |
|---|---|---|---|
| 1 | 0 – 10 | 0 | 0 |
| 2 | 10 – 20 | 0 | 0 |
| 3 | 20 – 30 | 2.4 | 0 |
| 4 | 30 – 40 | 18.9 | 0.2 |

Table 5-continued

| No. | fraction (ml) | Zn$^{2+}$ (%) | Hg$^{2+}$ (%) |
|---|---|---|---|
| 5 | 40 – 50 | 59.2 | 0.8 |
| 6 | 50 – 60 | 16.8 | 0.3 |
| 7 | 60 – 70 | 0.9 | 0 |
| 8 | 70 – 80 | 0 | 0 |
| 9 | 80 – 90 | 0 | 0 |
| 10 | 90 – 100 | 0 | 0 |
| | Total | 98.2 | 1.3 |

We claim:

1. A hetero-macrocyclic compound coated on the surface of a solid useful for the selective capture of a cation, comprising a reaction mixture of: (a) a hetero-macrocyclic compound having at least one amino group in the molecule having the following structural formula:

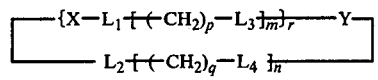

wherein X is an amino- or alkylamino-substituted divalent aromatic or alicyclic hydrocarbon radical, or hetero-cyclic radical or —NH—; Y is an amino- or alkylamino-substituted aromatic or alicyclic hydrocarbon radical or heterocyclic radical, —CH$_2$—CH$_2$—,

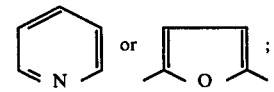

L$_1$, L$_2$, L$_3$ and L$_4$ are independently —O—, —S—, or

(and R is a hydrocarbon radical having 1 to 10 carbon atoms);

p and q are independently 2 or 3; r is 1, 2 or 3; and m and n are independently from 1 to 7; and, (b) a compound selected from the group consisting of an epoxy compound and an isocyanate compound.

2. A hetero macrocyclic compound coated on the surface of the solid of claim 1, wherein the solid is selected from the group consisting of metal, glass, ceramic, alumina, silica, diatomaceous earth, carbon, sand, clay, cellulose, polyamide, polystyrene, polyester and polyacrylonitrile.

* * * * *